3,347,941
TRIPHENYL METHANE FREE RADICALS
AND THEIR PREPARATION
Manuel Ballester, Juan Castaner, and Juan Riera, Barcelona, Spain, assignors, by mesne assignments, to E. I. du Pont de Nemours and Company, Wilmington, Del.
No Drawing. Filed Oct. 8, 1965, Ser. No. 494,269
6 Claims. (Cl. 260—649)

This invention relates to halogenated aromatic substances and processes for their preparation. More specifically the invention relates to chlorinated triarylmethyl free radical compositions and their preparation.

The novel compositions of this invention are free radical compositions represented by the formula

or, as is sometimes written,

wherein C represents a neutral trivalent carbon atom, and Ar, Ar' and Ar'' separately each represent perchlorophenyl or perchlorobiphenylyl; and Ar and Ar', when joined together, represent perchloro-2,2'-biphenylylene. These novel compositions are characterized by their unusual stability. They are paramagnetic substances and show an exceptional degree of chemical inertness toward oxygen, chlorine, bromine, iodine, nitric oxide and solvents.

The novel compositions of this invention are prepared by reacting at about reflux temperatures a compound of the formula

with a base, preferably an alkali metal hydroxide in the presence of a diluent, followed by treatment with an oxidizing agent.

Especially suitable diluent media are compounds of high dielectric constant, such as dimethyl sulfoxide or dimethylformamide, mixed with ethers such as ethyl ether, tetrahydrofuran or dioxane, in variable proportions.

Oxidizing agents such as iodine or oxygen are conveniently employed.

The products can be isolated by conventional practices, e.g., the iodine can be eliminated by adding a sodium chloride/sodium bisulfite solution, while dimethyl sulfoxide can be eliminated with water. The products can be purified by dissolving them in a hydrocarbon solvent such as hexane and passing the solution through a chromatographic adsorbent such as alumina or silica gel. The entire reaction is conducted under an inert atmosphere, e.g., nitrogen.

The following examples illustrate further the products and process of this invention.

Example I 8.26 parts by weight of a α-H-pentadecachlorotriphenylmethane,

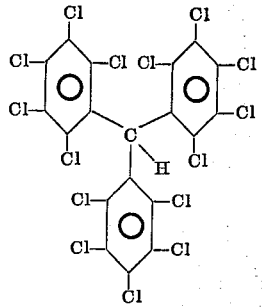

is dissolved in a mixture of 1700 parts by weight of ethyl ether and 525 parts by weight of dimethyl sulfoxide. 20 to 100 parts by weight of finely pulverized sodium hydroxide is added and the mixture heated at reflux for half an hour. After agitating vigorously for 12 hours at room temperature, the mixture is filtered, and the resulting solution is mixed with another solution containing 30 parts by weight of iodine in ethyl ether. The solution is treated with a diluted aqueous solution of sodium bisulfite to remove the excess iodine, and washed with water to eliminate the dimethyl sulfoxide. After drying and elimination of the solvent, 8.18 parts by weight of the perchlorotriphenylmethyl radical is obtained. It is a paramagnetic crystalline solid of blood-red color.

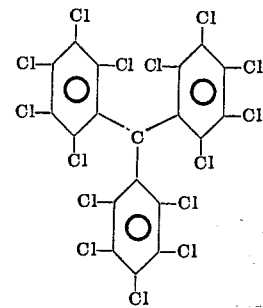

The product is purified by dissolving in hexane and passing the solution through chromatographic silica gel. After elimination of the solvent, 7.23 parts by weight of the pure product is obtained. This represents a molar efficiency of 87% based on the initial quantity of α-H-pentadecachlorotriphenylmethane. Melting point: 305° C. (with decomposition).

Analysis.—Calculated for $C_{19}Cl_{15}$: C, 30.1%; Cl, 69.9%; molecular wt., 760. Found: C, 30.2%; Cl, 69.9%; molecular wt., 771.

Infrared spectrum.—Frequencies of the absorption peaks in cm.$^{-1}$: 1504 (weak), 1332 (strong), 1309 (medium), 1255 (strong), 815 (medium), 738 (medium), 709 (weak), 694 (weak).

Ultraviolet and visible spectrum.—Wave lengths of absorption peaks in m$\mu$: 220, 285, 367 (shoulder), 382, 510, 562. Corresponding molar extinctions: 123,000, 5,400, 18,900, 37,100, 1,190, 1,200.

*Electron paramagnetic resonance spectrum.*—In chloroform: g factor=2.0029. No hyperfine structure was detected. In solid state—number of spins per mole: $5 \times 10^{23}$ (experimental error 50%).

Example II

A mixture of 1.01 parts by weight of α-H-nonadecachloro-4-phenyltriphenylmethane, 600 parts by weight of absolute ethyl ether, and 120 parts by weight of dimethylsulfoxide, maintained under an inert atmosphere, is warmed at reflux for 15 minutes. The mixture is allowed to cool and, while always maintaining an inert atmoshere, there is added an excess, for example of 1–2.5 parts by weight of finely divided sodium hydroxide.

The mixture is refluxed for 2 hours, is allowed to cool, is stirred vigorously for 12 hours, is filtered, and the filtered solution is poured over a mixture of an excess, for example of 3 parts by weight of iodine, in 50 parts by weight of absolute ethyl ether and the mixture is allowed to stand for 24 hours.

By destruction of the iodine with an aqueous solution of sodium bisulfite, followed by washing with water, drying and elimination of the solvent, there is obtained a red crystalline solid, of melting point above 300° C., which is purified by passing its solution in carbon tetrachloride over chromatographic silica gel and, ultimately, by recrystallization from suitable organic solvents.

There is thus obtained 0.78 part by weight of the radical perchloro-4-phenyltriphenylmethyl, which represents a molal yield of 77%, based on the initial amount of α-H-nonadecachloro-4-phenyltriphenylmethane.

*Analysis.*—Calculated for $C_{25}Cl_{19}$: C, 30.8%. Found: C, 30.8%.

*Infrared spectrum.*—Frequencies of the absorption maxima at cm.$^{-1}$: 1505 (weak), 1350 (medium), 1330 (strong), 870 (weak), 820 (medium), 757 (medium), 733 (medium), 704 (medium), 694 (medium).

*Ultraviolet-visible spectrum.*—Wave lengths of the absorption maxima in mμ: 288, 340 (shoulder), 370 (shoulder), 385, 520 (flat peak), 570. Corresponding molal extinctions: 5400, 4600, 15,700, 31,000, 950, 920.

*Electron paramagnetic resonance spectrum.*—Saturated solution in 1,2-dimethoxyethane: Single line at g=2.00267 (±0.00006) of width 3.46 (±0.02) Oe. In solid state (polycrystalline): Single line at g=2.00270 (±0.00006) of width 6.77 (±0.02) Oe.

By employing such reactants as α-H-tridecachloro-9-phenylfluorene, products such as perchloro-9-phenylfluorenyl (Ar and Ar' taken together are perchloro-2,2'-biphenylylene) can be obtained.

The reactants employed in the process of this invention can be prepared by treating the parent hydrocarbons with the nuclear chlorinating agent described by Ballester et al., J. Am. Chem. Soc., 82, 4254 (1960). For example, triphenylmethane and 4-phenyltriphenylmethane are chlorinated by this method to provide the starting materials used in Examples 1 and 2, respectively.

The usual inertness of the products of this invention make them useful as standards for the measurement of electron paramagnetic resonance, as semiconductive materials, and as magnetic materials.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A composition of the formula

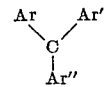

wherein C represents a neutral trivalent carbon atom and Ar, Ar' and Ar'' separately each represent perchlorophenyl or perchlorobiphenylyl; and Ar and Ar', when joined together, represent perchloro-2,2'-biphenylylene.

2. The composition of claim 1 wherein Ar, Ar' and Ar'' are perchlorophenyl groups.

3. Perchloro-4-phenyltriphenylmethyl.

4. A process for preparing compositions of the formula

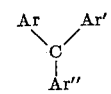

wherein C represents a neutral trivalent carbon atom and Ar, Ar' and Ar'' separately each represent perchlorophenyl or perchlorobiphenylyl; and Ar and Ar', when joined together, represent perchloro-2,2'-biphenylylene, which comprises reacting in an inert atmosphere a compound of the formula

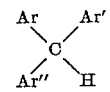

wherein Ar, Ar' and Ar'' are defined as above, with a base in a diluent medium selected from the group consisting of dimethyl sulfoxide and dimethyl formamide, in admixture with an ether selected from the group consisting of ethyl ether, tetrahydrofuran and dioxane followed by treatment with an oxidizing agent selected from the group consisting of iodine and oxygen while maintaining the inert atmosphere.

5. The process of claim 4 wherein the base is an alkali metal hydroxide.

6. The process of claim 5 wherein the oxidizing agent is iodine.

No references cited.

LEON ZITVER, *Primary Examiner.*

N. J. KING, JR., H. MARS, *Assistant Examiners.*